(12) United States Patent
Kelledes et al.

(10) Patent No.: US 6,843,749 B2
(45) Date of Patent: Jan. 18, 2005

(54) APPARATUS AND METHOD TO ACHIEVE MULTIPLE EFFECTIVE RATIOS FROM A FIXED RATIO TRANSAXLE

(75) Inventors: William Kelledes, Canton, MI (US); Richard L. Willis, Belleville, MI (US)

(73) Assignee: Ballard Power Systems Corporation, Dearborn, MI (US)

( * ) Notice: Subject to any disclaimer, the term of this patent is extended or adjusted under 35 U.S.C. 154(b) by 0 days.

(21) Appl. No.: 10/346,554

(22) Filed: Jan. 16, 2003

(65) Prior Publication Data

US 2003/0155165 A1 Aug. 21, 2003

Related U.S. Application Data

(60) Provisional application No. 60/319,076, filed on Jan. 16, 2002.

(51) Int. Cl.$^7$ ............................................. F16H 48/20
(52) U.S. Cl. ........................... 475/224; 475/223; 475/5; 180/248; 180/244
(58) Field of Search ............................ 192/17 R, 17 C, 192/13 R; 180/248, 249, 244; 477/35; 475/306, 224, 223, 5

(56) References Cited

U.S. PATENT DOCUMENTS

| | | | | |
|---|---|---|---|---|
| 4,486,010 A | * | 12/1984 | Haas, Jr. ........................ 269/3 |
| 5,407,024 A | * | 4/1995 | Watson et al. .............. 180/248 |
| 5,441,136 A | * | 8/1995 | Greaves et al. ........... 192/13 R |
| 6,371,878 B1 | | 4/2002 | Bowen .......................... 475/5 |
| 6,634,976 B1 | * | 10/2003 | Britt ............................. 475/91 |
| 2002/0045507 A1 | | 4/2002 | Bowen .......................... 475/5 |

* cited by examiner

*Primary Examiner*—Charles A. Marmor
*Assistant Examiner*—Eric M. Williams
(74) *Attorney, Agent, or Firm*—Seed IP Law Group PLLC (57) ABSTRACT

A motor vehicle drive train assembly for achieving multiple effective ratios from a single ratio transaxle enables application of a fixed ratio transaxle, such as used in electric vehicle drive trains, to a multi-speed requirement, for example, in airport ground support equipment. Multiple configurations are enabled by varying the relative speed of the outputs through the differential of the transaxle, such as bringing one of the outputs to zero, or by using another motor to control the speed of one of the outputs.

9 Claims, 2 Drawing Sheets

APPARATUS AND METHOD TO ACHIEVE MULTIPLE EFFECTIVE RATIOS FROM A FIXED RATIO TRANSAXLE

BACKGROUND OF INVENTION

1. Field of the Invention

The present invention relates generally to the field of vehicles, and particularly to vehicle drive trains.

2. Description of the Related Art

Airlines use push-back tractors to move aircraft around at airports. Such tractors need to operate at low speed and high torque in order to move aircraft. However, when the tractors uncouple from the aircraft, it is important for them to be able to get back to the gate area as fast as possible, which requires operating at high speed and low torque. Tractors, and other vehicles powered by internal combustion engines, employ multi-speed gear boxes that enable an operator to deal with this two-mode operation simply by shifting gears. However, this two-mode operation remains a problem for vehicles having electric power trains because a typical gear box configuration for an electric power train application is a single speed (i.e., gear ratio) without a clutch or a gear shift.

BRIEF SUMMARY

Disclosed are methods and apparatus directed to providing a motor vehicle drive train assembly that enables application of a fixed ratio transaxle, such as used in electric vehicle drive trains, to a multi-speed requirement, especially in airport ground support equipment.

In one aspect, a drive train for a vehicle includes at least a first integrated power train unit comprising a motor, a first integrated power train differential assembly, a first output shaft and a second output shaft, the motor drivingly coupled to the first integrated power train differential assembly to transfer torque to each of the first and the second output shafts; at least a first axle differential assembly drivingly coupled to the first output shaft of the first integrated power train differential assembly; and a brake assembly adapted to apply a braking force at the second output shaft of the first integrated power train differential assembly.

In another aspect, the drive train assembly may further include a second axle differential assembly; a clutch assembly selectively operable to couple the second output shaft of the first integrated power train differential assembly to the second axle differential assembly in a disengaged condition corresponding to a four-wheel drive mode and to uncouple the second output shaft of the first integrated power train differential assembly and the second axle differential assembly in an engaged condition corresponding to a two-wheel drive mode.

In a further aspect, the drive train assembly may further include a second integrated power train unit comprising a second motor, a second integrated power train differential assembly, a first output shaft and a second output shaft, the second motor drivingly coupled to the second integrated power train differential assembly, wherein the first vehicle axle shaft differential assembly is drivingly coupled to the first output shaft of the second integrated power train differential assembly via the first integrated power train differential assembly.

In yet another aspect, a method of operating a vehicle having at least a first integrated power train unit having a differential assembly includes in a first mode, causing at least the first integrated power train unit to drive only a first of at least two axle; and in a second mode, causing at least the first integrated power train unit to drive at least the first and a second axle of the at least two axles. Causing at least the first integrated power train unit to drive only a first of at least two axle assemblies may include engaging a clutch to uncouple the second axle and the differential assembly of at least the first integrated power train unit, and applying a brake to apply a braking force between the clutch and the differential assembly of at least the first integrated power train unit. Causing at least the first integrated power train unit to drive at least the first and a second axle of the at least two axles may include disengaging a clutch to couple the second axle to the differential assembly at least the first integrated power train unit, and releasing a brake to remove a braking force from between the clutch and the differential assembly of at least the first integrated power train unit.

In a further aspect, a drive train for a vehicle may include means for causing at least a first integrated power train unit to drive only a first of at least two axle in a first mode; and means for causing at least the first integrated power train unit to drive at least the first and a second axle of the at least two axles in a second mode.

Additional novel features and advantages will be set forth in part in the description which follows, and in part will become more apparent to those skilled in the art upon examination of the following, or may be learned by practice of the invention.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a through understanding of various embodiments of the invention. However, one skilled in the art will understand that the invention may be practiced without these details. In other instances, well-known structures associated with have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

The headings provided herein are for convenience only and do not interpret the scope or meaning of the claimed invention.

The below teachings address the dilemma of two-mode operation in an electric drive train application with a conventional one speed gear box configuration without a gear shift. The teachings rely on the use of one or more differentials. A feature of differentials is that when torque is applied to an input of the differential, there are at least two outputs. The differential splits the torque from the drive motor between the outputs, so that each wheel or set of wheels receives a portion of the torque from the drive motor. All things being equal, the torque is split evenly between each wheel in the set of wheels, or between each of the set of wheels.

Figure 1:
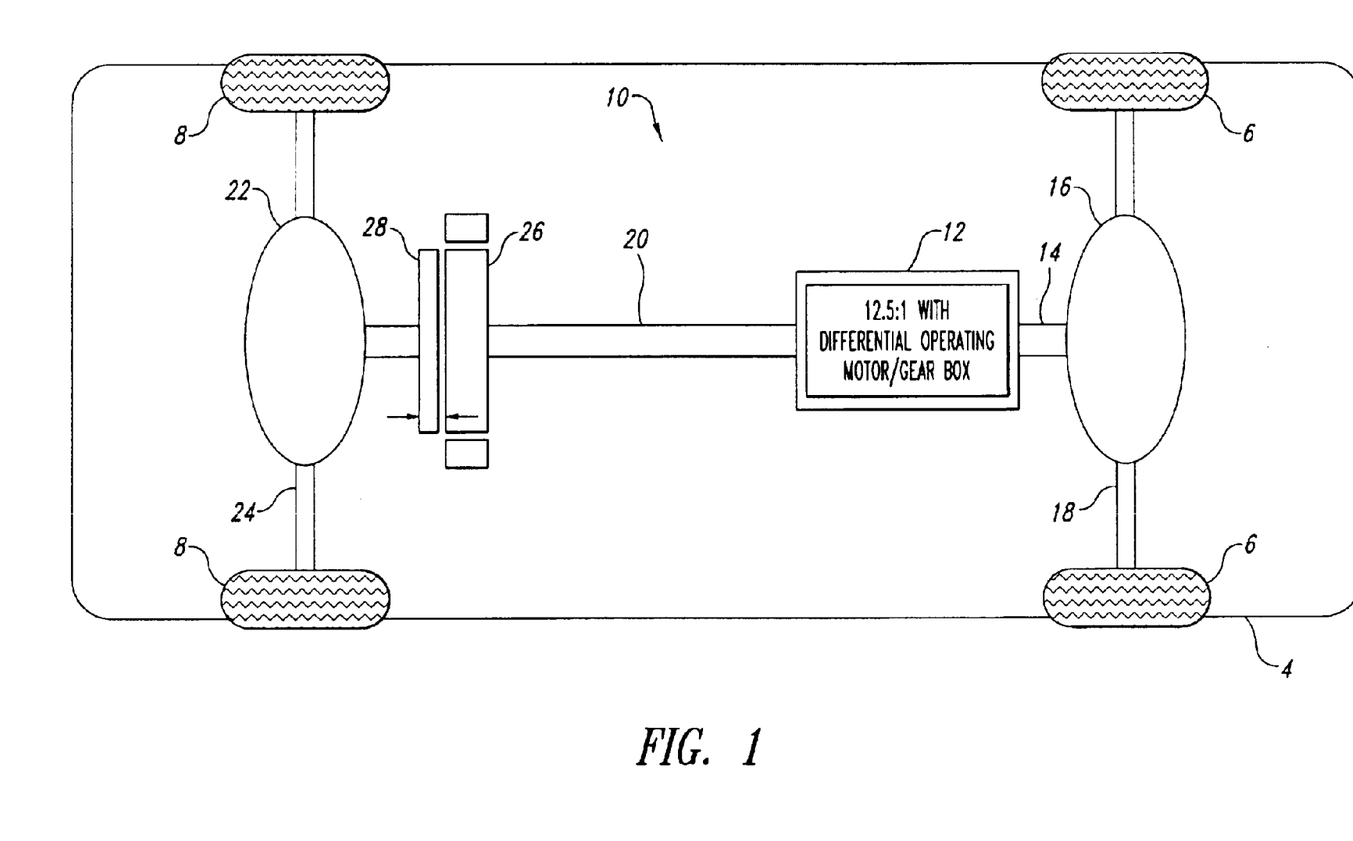
FIG. 1 is a block diagram of a vehicle including an electric drive train utilizing a single electric motor/transaxle unit according to one illustrated embodiment of the present invention.

FIG. 1 shows a vehicle 4 having rear wheels 6, front wheels 8, and an electric drive train 10 that utilizes a single electric motor/transaxle unit 12. It is to be understood that the housing for the electric motor/transaxle unit 12 is grounded or non-rotating with respect to the vehicle 4.

The drive train 10 includes the motor/transaxle unit 12, a first output shaft 14, a rear differential 16, a second output shaft 20, and a front differential 22. The first output shaft 14 is coupled to the rear differential 16 to transmit power to the rear wheels 6 of the vehicle 4 via a rear axel 18. The second output shaft 20 is coupled to the front differential 22 to transmit power to the front wheels 8 of the vehicle 4 via a front axle 24. In some embodiments, the drive train 10 may also include the rear axle 18 and/or the front axle 24, while in other embodiments the rear axle 18 and/or front axle 24 are considered part of the vehicle 4 rather than the drive train 10. The drive train 10 also includes a brake 26, and a clutch 28 for selectively coupling the second output shaft 20 to the front differential 22. The motor/transaxle unit 12 is a commercially available type that includes, for example, an electric motor and typical components of a transaxle, including, for example, transmission, axle, clutch, gearbox, and differential combined in a single unit.

In one embodiment, two mode operation is achieved by applying a braking force to one of the output shafts 14, 20 via the brake 26. While illustrated as being applied to the second output shaft 20, the braking force alternatively, or additionally can be applied to the first output shaft 14. This takes advantage of the ability of the differential to distribute the power between output shafts 14, 20 as required. Application of a braking force to the second output shaft 20 increases the speed of the first output shaft 14. For example, where the braking force is sufficient to stop the second output shaft 20, the first output shaft 14 which is not restrained by the brake 26, may travel at up to twice the speed as when the brake 26 was not applied.

Thus, multiple configurations are possible utilizing the fact that by varying the relative speed of the outputs through the differential, either bringing one output shaft 20 to zero, or by using another motor to control the speed of the output shaft 20, the ratios can be varied to one axle, for example the rear axle 18, carrying one set of wheels, for example rear wheels 6. In other words, one output shaft 20 of the differential of the motor/transaxle unit 12 can either, and or both, be connected via the clutch 28 to an axle 24 or locked by the brake 26 to force the other output shaft 14 to operate at double speed. This provides either high torque at low speed or lower torque at higher speed, which suits certain applications such as aircraft push-back tractors.

Typically, the differential of a vehicle, such as rear wheel drive car or a truck, is disposed at the rear end of the car or truck with a drive element going into the differential. A drive shaft is coupled to the differential to provide torque, and two shafts extend from the differential that are coupled to the wheels of the car or truck. The amount of torque applied to the input of the differential is typically twice the amount of torque that goes to each wheel, and each wheel receives one-half the amount of torque that is applied to the input assuming that the vehicle is proceeding in a straight line and there is no slippage of the wheels. Minor variations that occur when proceeding around a turn are insignificant factors that are not important to the present discussion.

If one of the two wheels is brought to a stop, the other wheel, when lifted off the supporting surface, turns twice as fast. In essence, this important feature of differentials is they can change speed without changing any parts. By stopping one wheel and lifting the other, nothing is structurally changed except the conditions under which the differential was operating. That is different from an automatic or a manual transmission in which it is necessary to structurally change the arrangements of parts to adjust the torque.

Typical vehicles must perform at a large variety of different loads and speeds, whether the vehicle is powered by an internal combustion engine and/or an electric motor. However, where the vehicle is a push-back tractor, there are only two specific modes in the duty cycle. A high torque and low speed mode is required to push back an aircraft, and a low torque and high speed mode is needed to return to the terminal area after pushing back the aircraft. Certain other vehicles face similar demands, for example, forklifts.

In typical vehicles, whether front or rear wheel drive, there is a differential designed to equally split the torque to the ground. The differential also allows the wheels to travel different distances, for example, as the vehicle goes around corners. Currently, the transaxle is used in what is referred to as an east/west configuration. The east/west configuration means that the differential is disposed between the two rear wheels 6 or between the two front wheels 8 of the vehicle. In such an arrangement, the differential of the transaxle is designed to split the torque equally to each of the driving wheels.

Referring to FIG. 1, the same transaxle, incorporated in the motor/transaxle unit 12 is turned north/south (i.e., between the rear and front axles 18, 24). The transaxle 12, which is an integrated power train, has it own differential. From each of the two output shafts 14, 20 of the transaxle that ordinarily would have gone to the vehicle wheels, the transaxle feeds into a second differential 16 and 22. One output shaft 20 of the transaxle feeds through the clutch 28 and brake 26 to another differential 22, for example, to the front axle 24 of the vehicle. The other output shaft 20 of the transaxle feeds, for example, the rear axle 18 of the vehicle.

Thus, the arrangement for utilizes three differentials, namely the front 22 and rear 16 differentials, and the central or north/south differential that is an integrated component of the motor/transaxle unit 12. Varying the speed on one of the output shafts, for example the front output shaft 20 of the integrated power train 12 changes the torque and the speed output at the output shaft on the opposite side of the integrated power train 12, for example, output shaft 14. By engaging the clutch 28 to uncouple one output shaft 20 from the front differential 22 and applying the brake 26 to bring the speed of the uncoupled output shaft 20 to zero, the axle 18 and wheels 30 of the differential 16 coupled to the other output shaft 14 can be driven at twice the speed.

This structural arrangement helps makes possible the two mode operation. For example, the vehicle can be operated at a relatively low speed and high torque in a four-wheel drive mode by disengaging the clutch 28 and releasing the brake 26. Disengaging the clutch 28 couples the front differential 22 from front output shaft 20, while releasing the brake 26 frees the output shaft 20 to rotate unhindered. Alternatively, the vehicle can be operated at relatively high speed (e.g., twice the speed) and low torque (e.g., half the torque) in a two wheel drive by engaging the clutch 28 and applying the brake 26. Engaging the clutch 28 uncouples the front differential 22 from front output shaft 20, while applying the brake 26 hinders the output shaft 20 from rotating, causing the differential in the motor/transaxle 12 to allocate more power to driving the rear differential 16. This operation solves the duty cycle issue with push-back tractors and enables on operator to travel back to the gate twice as fast and yet still employ full torque when pushing airplanes.

Figure 2:
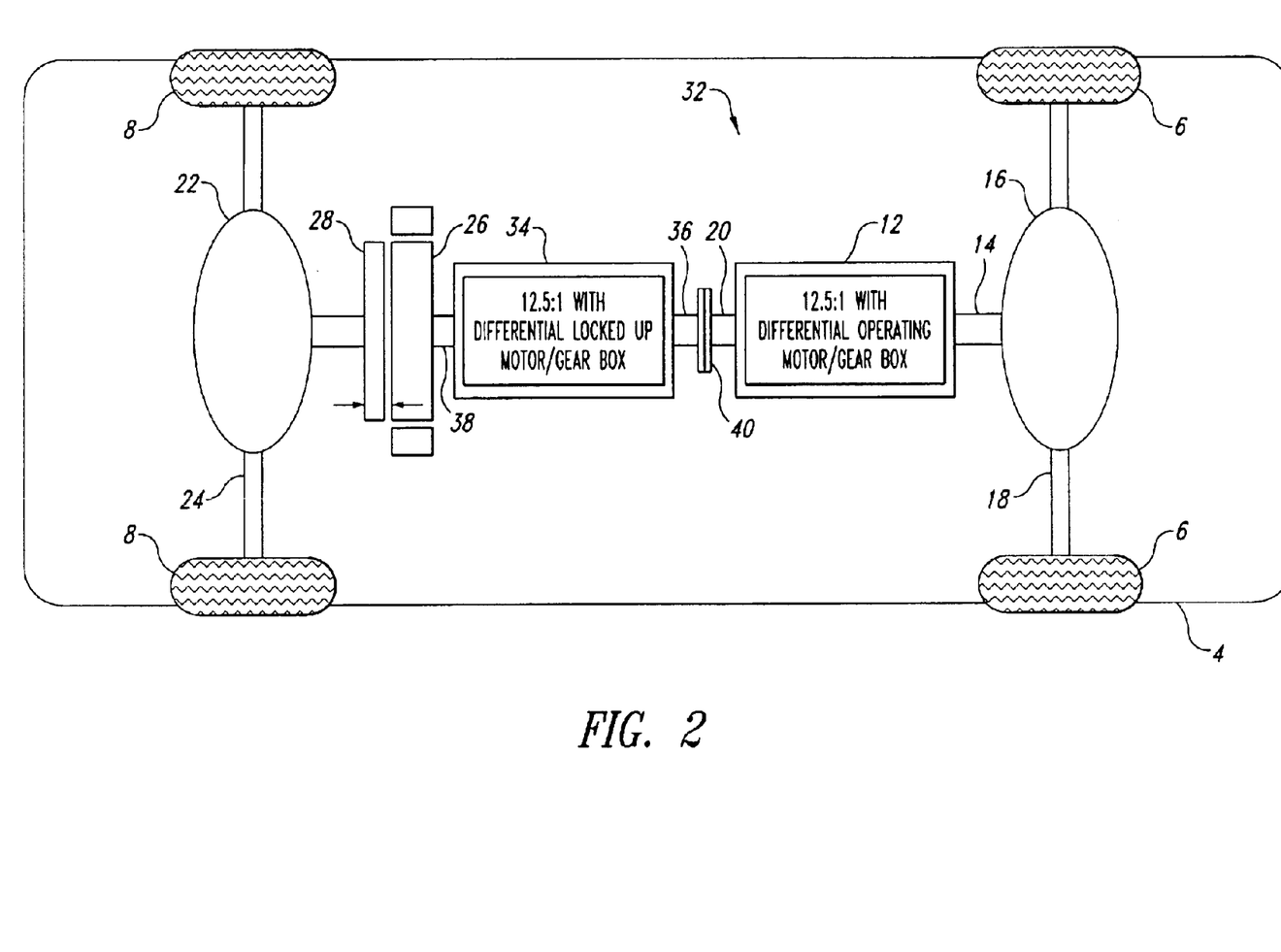
FIG. 2 is a block diagram of a vehicle including an electric drive train utilizing two electric motor/transaxle units for the CVT mode according to another illustrated embodiment of the present invention.

FIG. 2 shows another embodiment of the drive train assembly that enables operation in a continuously variable transmission (CVT) mode, utilizing a multiple integrated power train arrangement. This embodiment operates on the same principle as the previously described embodiment, but employs at least two electric motor/transaxle units.

In particular, an electric drive train 32 for a vehicle 4 comprises a first motor/transaxle unit 12, a first output shaft 14, a rear differential 16, a second output shaft 20, a front differential 22, a second motor/transaxle unit 34, a rear output shaft 36, a front output shaft 38, and a coupling 40. It is to be understood that the housings for both motor/transaxle units 12, 34 are grounded or non-rotating with respect to the vehicle 4. The front output shaft 20 of the first motor/transaxle unit 12 is coupled to the rear output shaft 36 via the coupling 40. The rear output shaft 14 of the first motor/transaxle unit 12 is coupled to the rear wheels 6 of the vehicle 4 through the rear differential 16 and rear axle 18. The front output shaft 38 of the second motor/transaxle unit 34 is coupled to the front wheels 8 of the vehicle 4 via the front differential 22 and front axle 24. The electric drive train 32 also includes a brake 26, and a clutch 28 for selectively coupling the front output shaft 38 of the second motor/transaxle unit 34 to the front differential 22.

In this embodiment, when the clutch 28 is disengaged all four wheels 6, 8 are operating, and the motors of both motor/transaxle units 12, 24 can be turning in the same direction to provide twice the power and twice the torque to all four wheels 6, 8 with respect to the power provide by a single one of the motor/transaxle units 12.

Alternatively, when the clutch 28 is engaged and the brake 26 is applied (i.e., in a two wheel drive CVT mode), the speed and torque applied by the output shaft 14 to the rear axle 18 can be continuously changed or varied by varying the speed of the motor/transaxle unit 34 with the brake 26 applied to the front output shaft 36, depending on the speed of the motor/transaxle unit 34. While the brake 26 is applied, as the speed of the second motor/transaxle unit 34 is slowed, the speed of the output shaft 14 to the rear axle 18 is increased up to twice its speed when driven solely by the first motor/transaxle unit 12.

Depending on the duty cycle desired for a particular application, various operating methods may apply. For example, the electric drive train 32 may be operated with the clutch 28 disengaged and the brake 26 released (i.e., open or disengaged) to drive the front 24 and rear axles 18 with the same ratio, or with the clutch 28 engaged and the brake 26 applied (i.e., closed or engaged) to drive the rear axle 18 at twice the standard speed and half the standard torque.

The two electric motor/transaxle units 12, 34 can be used as a two speed gearbox with combined power with the second unit 34 doubling the power. For example, with the clutch 28 engaged and the brake 26 applied, the second motor/transaxle unit 34 can serve as a variable speed reactor to provide a CVT action in the main motor/transaxle unit 12. This structural configuration provides high torque and low speed with four wheel drive and higher speed and low torque in two wheel drive.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention. For example, the EV vehicle 4 can take any of a variety of forms including, but not limited to, push-tractors, forklifts, automobiles, trucks, buses, or boats.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Application No. 60/319,076, filed Jan. 16, 2002, are incorporated herein by reference, in their entirety.

What is claimed is:

1. A drive train for a vehicle, comprising:
    a first integrated power train unit comprising a motor, a first integrated power train differential assembly, a first output shaft and a second output shaft, the motor drivingly coupled to the first integrated power train differential assembly to transfer torque to each of the first and the second output shafts;
    a first axle differential assembly drivingly coupled to the first output shaft of the first integrated power train unit;
    a brake assembly adapted to apply a braking force to the second output shaft of the first integrated power train unit;
    a second axle differential assembly; and
    a clutch assembly selectively operable to couple the second output shaft of the first integrated power train unit to the second axle differential assembly in a four-wheel drive mode, and to uncouple the second output shaft of the first integrated power train unit from the second axle differential assembly in a two-wheel drive mode.

2. The drive train according to claim 1 wherein the motor is an electric motor.

3. The drive train according to claim 1 wherein the first integrated power train differential assembly is part of a transaxle unit.

4. The drive train according to claim 1, further comprising:
    a first axle drivingly coupled to the first output shaft of the first integrated power train unit via the first axle differential assembly.

5. The drive train according to claim 1 wherein the first integrated power train differential assembly is configured to increase a speed at the first output shaft of the first integrated power train unit by a predefined ratio upon application of the braking force to the second output shaft of the first integrated power train unit.

6. The drive train according to claim 1 wherein the first integrated power train differential assembly is configured to decrease a torque at the first output shaft of the first integrated power train unit by a predefined ratio upon application of the braking force to the second output shaft of the first integrated power train unit.

7. A method of operating a vehicle, the vehicle comprising:

a first integrated power train unit comprising a motor, a first integrated power train differential assembly, a first output shaft and a second output shaft, the motor drivingly coupled to the first integrated power train differential assembly to transfer torque to each of the first and the second output shafts;

a first axle drivingly coupled to the first output shaft of the first integrated power train unit; and a second axle the vehicle further comprises a brake assembly adapted to apply a braking force to the second output shaft of the first integrated power train unit and wherein the method further comprises applying the braking force in the first mode, and the method comprising:

in a first mode, causing the first integrated power train unit to drive only the first axle by uncoupling the second output shaft of the first integrated power train unit from the second axle; and in a second mode, causing the first integrated power train unit to drive both the first axle and the second axle by coupling the second output shaft of the first integrated power train unit to the second axle.

8. The method of claim 7 wherein the vehicle further comprises a brake assembly adapted to apply a braking force to the second output shaft of the first integrated power train unit, and wherein the braking force is not applied in the second mode.

9. A drive train for a vehicle, comprising:

a first integrated power train unit comprising a motor, a first integrated sower train differential assembly, a first output shaft and a second output shaft, the motor drivingly coupled to the first integrated power train differential assembly to transfer torque to each of the first and the second output shafts;

a first axle drivingly coupled to the first output shaft of the first integrated power train unit;

a second axle wherein the means for causing the first integrated power train unit to drive only the axle in a first mode and the means for causing the first integrated power train unit to drive both the first axle in a first mode and the means for causing the first integrated power train unit to drive both the first axle and the second axle in a second mode comprise a clutch assembly selectively operable to uncouple the second output shaft of the first integrated power train unit from the second axles in the first mode and couple the second output shaft of the first integrated power train unit from the second axles in the first mode and to couple the second output shaft of the first integrated power train unit to the second axle in the second mode, the drive train further comprising a brake assembly adapted to apply a braking force to the second output shaft of the first integrated power train unit;

means for causing the first integrated power train unit to drive only the first axle in a first mode by uncoupling the second output shaft of the first integrated power train unit from the second axle; and means for causing the first integrated power train unit to drive both the first axle and the second axle in a second mode by coupling the second output shaft of the first integrated power train unit to the second axle.

* * * * *

UNITED STATES PATENT AND TRADEMARK OFFICE
CERTIFICATE OF CORRECTION

PATENT NO. : 6,843,749 B2
DATED : January 18, 2005
INVENTOR(S) : William Kelledes and Richard L. Willis It is certified that error appears in the above-identified patent and that said Letters Patent is hereby corrected as shown below:

Column 7,
Lines 7-14,
"a first axle drivingly coupled to the first output shaft of the first integrated power train unit; and
a second axle the vehicle further comprises a brake assembly adapted to apply a braking force to the second output shaft of the first integrated power train unit and wherein the method further comprises applying the braking force in the first mode, and the method comprising;"
should read:
-- a first axle drivingly coupled to the first output shaft of the first integrated power train unit;
a second axle; and
a brake assembly adapted to apply a braking force to the second output shaft of the first integrated power train unit, and the method comprising: --.
Line 18, "the second axle; and" should read -- the second axle, and applying the braking force; and --.
Lines 23-27,
'The method of claim 7 wherein the vehicle further comprises a brake assembly adapted to apply a braking force to the second output shaft of the first integrated power train unit, and wherein the braking force is not applied in the second mode."
should read:
-- The method of claim 7 wherein the braking force is not applied in the second mode. --.
Line 30, "sower should read -- power --.

Column 8,
Lines 5-29,
"a second axle wherein the means for causing the first integrated power train unit to drive only the axle-in a first mode and the means for causing the first integrated power train unit to drive both the first axle in a first mode and the means for causing the first integrated power train unit to drive both the first axle and the second axle in a second mode comprise a clutch assembly selectively operable to uncouple the second output shaft of the first integrated power train unit from the second axles in the first mode and to couple the second output shaft of the first integrated power train unit from the second axles in the first mode and to couple the second output shaft of the first integrated power train unit to the second axle in the second mode, the drive train further comprising a brake assembly adapted to apply a braking force to the second output shaft of the first integrated power train unit;
means for causing the first integrated power train unit to drive only the first axle in a first mode by uncoupling the second output shaft. of the first integrated power train unit from the second axle; and

UNITED STATES PATENT AND TRADEMARK OFFICE
CERTIFICATE OF CORRECTION

PATENT NO. : 6,843,749 B2
DATED : January 18, 2005
INVENTOR(S) : William Kelledes and Richard L. Willis It is certified that error appears in the above-identified patent and that said Letters Patent is hereby corrected as shown below:

Column 8 (cont'd),
    means for causing the first integrated power train unit to drive both the first axle and second axle in a second mode by coupling the second output shaft of the first integrated power train unit to the second axle." should read:
-- a second axle;
    means for causing the first integrated power train unit to drive only the first axle in a first mode by uncoupling the second output shaft of the first integrated power train unit from the second axle;
    means for causing the first integrated power train unit to drive both the first axle and the second axle in a second mode by coupling the second output shaft of the first integrated power train unit to the second axle;
    a brake assembly adapted to apply a braking force to the second output shaft of the first integrated power train unit,
    wherein the means for causing the first integrated power train unit to drive only the first axle in a first mode and the means for causing the first integrated power train unit to drive both the first axle and the second axle in a second mode comprises a clutch assembly selectively operable to uncouple the second output shaft of the first integrated power train unit from the second axle in the first mode and to couple the second output shaft of the first integrated power train unit to the second axle in the second mode. --.

After line 30, the following claims 10-17 should be added:
    -- 10. The drive train according to claim 1, further comprising:
    a second integrated power train unit comprising a second motor, a second integrated power train differential assembly, a first output shaft and a second output shaft, the second motor drivingly coupled to the second integrated power train different-tial assembly, wherein the first axle differential assembly is drivingly coupled to the first output shaft of the second integrated power train unit via the first integrated power train unit, and wherein the second output shaft of the first integrated power train unit is coupled to the second axle differential assembly via the second integrated power train unit.

11. The drive train according to claim 10 wherein the second motor is an electric motor.

12. The drive train according to claim 10 wherein the second integrated power train differential assembly is a portion of a second transaxle.

13. The drive train according to claim 10 wherein the second integrated power train differential assembly is configured to increase a speed at the first output shaft of the second integrated power train unit by a predefined variable ratio upon application of the braking force to the second output shaft of the first integrated power train unit.

UNITED STATES PATENT AND TRADEMARK OFFICE
CERTIFICATE OF CORRECTION

PATENT NO. : 6,843,749 B2
DATED : January 18, 2005
INVENTOR(S) : William Kelledes and Richard L. Willis It is certified that error appears in the above-identified patent and that said Letters Patent is hereby corrected as shown below:

Column 8 (cont'd),
14. The method of claim 7 wherein:
the vehicle further comprises a second integrated power train unit comprising a second motor, a second integrated power train differential assembly, a first output shaft and a second output shaft, the first output shaft of the second integrated power train unit being coupled to the second output shaft of the first integrated power train unit;
the brake assembly is adapted to apply the braking force to the second output shaft of the first integrated power train unit via the second integrated power train unit; and
causing the first integrated power train unit to drive only the first axle comprises operating a clutch assembly to uncouple the second output shaft of the second integrated power train unit from the second axle and applying the braking force.

15. The method of claim 7 wherein:
the vehicle further comprises a second integrated power train unit comprising a second motor, a second integrated power train differential assembly, a first output shaft and a second output shaft, the first output shaft of the second integrated power train unit being coupled to the second output shaft of the first integrated power train unit; and
causing the first integrated power train unit to drive both the first axle and the second axle comprises operating a clutch assembly to couple the second output shaft of the second integrated power train unit to the second axle.

16. The method of claim 14 wherein the braking force is applied in proportion to a desired torque.

17. The method of claim, 14, further comprising adjusting a speed of the second motor to achieve a desired torque to the first axle in the first mode. --.

Signed and Sealed this

Thirty-first Day of May, 2005

JON W. DUDAS
*Director of the United States Patent and Trademark Office*

UNITED STATES PATENT AND TRADEMARK OFFICE
CERTIFICATE OF CORRECTION

PATENT NO.    : 6,843,749 B2
DATED         : January 18, 2005
INVENTOR(S)   : William Kelledes and Richard L. Willis It is certified that error appears in the above-identified patent and that said Letters Patent is hereby corrected as shown below:

Column 7,
Lines 7-14,
"a first axle drivingly coupled to the first output shaft of the first integrated power train unit; and
a second axle the vehicle further comprises a brake assembly adapted to apply a braking force to the second output shaft of the first integrated power train unit and wherein the method further comprises applying the braking force in the first mode, and the method comprising;"
should read:
-- a first axle drivingly coupled to the first output shaft of the first integrated power train unit;
a second axle; and
a brake assembly adapted to apply a braking force to the second output shaft of the first integrated power train unit, and the method comprising: --.
Line 18, "the second axle; and" should read -- the second axle, and applying the braking force; and --.
Lines 23-27,
"The method of claim 7 wherein the vehicle further comprises a brake assembly adapted to apply a braking force to the second output shaft of the first integrated power train unit, and wherein the braking force is not applied in the second mode."
should read:
-- The method of claim 7 wherein the braking force is not applied in the second mode. --.
Line 30, "sower" should read -- power --.

Column 8,
Lines 5-29,
"a second axle wherein the means for causing the first integrated power train unit to drive only the axle-in a first mode and the means for causing the first integrated power train unit to drive both the first axle in a first mode and the means for causing the first integrated power train unit to drive both the first axle and the second axle in a second mode comprise a clutch assembly selectively operable to uncouple the second output shaft of the first integrated power train unit from the second axles in the first mode and to couple the second output shaft of the first integrated power train unit from the second axles in the first mode and to couple the second output shaft of the first integrated power train unit to the second axle in the second mode, the drive train further comprising a brake assembly adapted to apply a braking force to the second output shaft of the first integrated power train unit;
means for causing the first integrated power train unit to drive only the first axle in a first mode by uncoupling the second output shaft of the first integrated power train unit from the second axle; and

UNITED STATES PATENT AND TRADEMARK OFFICE
CERTIFICATE OF CORRECTION

PATENT NO. : 6,843,749 B2
DATED : January 18, 2005
INVENTOR(S) : William Kelledes and Richard L. Willis It is certified that error appears in the above-identified patent and that said Letters Patent is hereby corrected as shown below:

Column 8 (cont'd),
means for causing the first integrated power train unit to drive both the first axle and second axle in a second mode by coupling the second output shaft of the first integrated power train unit to the second axle." should read:
-- a second axle;
means for causing the first integrated power train unit to drive only the first axle in a first mode by uncoupling the second output shaft of the first integrated power train unit from the second axle;
means for causing the first integrated power train unit to drive both the first axle and the second axle in a second mode by coupling the second output shaft of the first integrated power train unit to the second axle;
a brake assembly adapted to apply a braking force to the second output shaft of the first integrated power train unit,
wherein the means for causing the first integrated power train unit to drive only the first axle in a first mode and the means for causing the first integrated power train unit to drive both the first axle and the second axle in a second mode comprises a clutch assembly selectively operable to uncouple the second output shaft of the first integrated power train unit from the second axle in the first mode and to couple the second output shaft of the first integrated power train unit to the second axle in the second mode. --.

After line 30, the following claims 10-17 should be added:
-- 10. The drive train according to claim 1, further comprising:
a second integrated power train unit comprising a second motor, a second integrated power train differential assembly, a first output shaft and a second output shaft, the second motor drivingly coupled to the second integrated power train differential assembly, wherein the first axle differential assembly is drivingly coupled to the first output shaft of the second integrated power train unit via the first integrated power train unit, and wherein the second output shaft of the first integrated power train unit is coupled to the second axle differential assembly via the second integrated power train unit.

11. The drive train according to claim 10 wherein the second motor is an electric motor.

12. The drive train according to claim 10 wherein the second integrated power train differential assembly is a portion of a second transaxle.

13. The drive train according to claim 10 wherein the second integrated power train differential assembly is configured to increase a speed at the first output shaft of the second integrated power train unit by a predefined variable ratio upon application of the braking force to the second output shaft of the first integrated power train unit.

UNITED STATES PATENT AND TRADEMARK OFFICE
CERTIFICATE OF CORRECTION

PATENT NO. : 6,843,749 B2
DATED : January 18, 2005
INVENTOR(S) : William Kelledes and Richard L. Willis It is certified that error appears in the above-identified patent and that said Letters Patent is hereby corrected as shown below:

Column 8 (cont'd),
    14. The method of claim 7 wherein:
    the vehicle further comprises a second integrated power train unit comprising a second motor, a second integrated power train differential assembly, a first output shaft and a second output shaft, the first output shaft of the second integrated power train unit being coupled to the second output shaft of the first integrated power train unit;
    the brake assembly is adapted to apply the braking force to the second output shaft of the first integrated power train unit via the second integrated power train unit; and
    causing the first integrated power train unit to drive only the first axle comprises operating a clutch assembly to uncouple the second output shaft of the second integrated power train unit from the second axle and applying the braking force.

15. The method of claim 7 wherein:
    the vehicle further comprises a second integrated power train unit comprising a second motor, a second integrated power train differential assembly, a first output shaft and a second output shaft, the first output shaft of the second integrated power train unit being coupled to the second output shaft of the first integrated power train unit; and
    causing the first integrated power train unit to drive both the first axle and the second axle comprises operating a clutch assembly to couple the second output shaft of the second integrated power train unit to the second axle.

16. The method of claim 14 wherein the braking force is applied in proportion to a desired torque.

17. The method of claim, 14, further comprising adjusting a speed of the second motor to achieve a desired torque to the first axle in the first mode. --.

Signed and Sealed this

Seventh Day of June, 2005

JON W. DUDAS
*Director of the United States Patent and Trademark Office*